United States Patent

Cox et al.

[15] 3,681,682

[45] Aug. 1, 1972

[54] METHOD AND APPARATUS FOR TESTING GAP SURFACE FINISH AND WINDING CHARACTERISTICS OF A MAGNETIC HEAD SUBASSEMBLY

[72] Inventors: Conrad M. Cox, Boulder; Robert B. Fischer, Longmont, both of Colo.

[73] Assignee: International Business Machines Corporation, Armonk, N.Y.

[22] Filed: Dec. 21, 1970

[21] Appl. No.: 99,943

[52] U.S. Cl. ....................324/34 R, 324/73, 29/603, 179/100.2 B

[51] Int. Cl. ....................G01r 35/00

[58] Field of Search......324/34 R, 158 F, 73; 29/603, 29/593; 179/100.2 B

[56] References Cited

UNITED STATES PATENTS

| | | | |
|---|---|---|---|
| 3,238,603 | 3/1966 | Curtis et al. | 29/603 |
| 3,526,835 | 9/1970 | Jones, Jr. | 29/593 |
| 3,534,470 | 10/1970 | Faure et al. | 29/603 |

OTHER PUBLICATIONS

Gagliano et al., Magnetic Head Tester; IBM Tech. Discl. Bull., Vol. 6, No. 3, Aug. 1963, pp. 1-2

McWhinney, N., Magnetic Transducer Quality Comparator, IBM Tech. Bull., Vol. 8, No. 7, Dec. 1965, p. 948

Frese, S., Inductive Tape Syn. For R- W Head Testing, IBM Tech. Bull., Vol. 11, No. 8, Jan. 1969, pp. 1043- 1044

*Primary Examiner*—Robert J. Corcoran
*Attorney*—Hanifin and Jancin and Gunter A. Hauptman

[57] ABSTRACT

Surface flatness, magnetic characteristics, electrical connections, etc. of one section of a multi-track magnetic recording head are tested during manufacture and before final assembly. A multi-track head section is mounted in a rotating fixture with the section's gap faces abutting a dummy block which closes the magnetic circuit. As the fixture is rotated, each track's winding is connected, in turn, to a vector impedance meter. The meter reading is compared with a predetermined value to indicate whether the head track winding, material, gap surface, etc. are within acceptable limits. A winding around the dummy block aids in determining whether the head windings are properly oriented and additional continuity tests identify open and shorted windings.

13 Claims, 7 Drawing Figures

INVENTORS
CONRAD M. COX
ROBERT B. FISCHER
BY
Gunter A. Hauptman
ATTORNEY

METHOD AND APPARATUS FOR TESTING GAP SURFACE FINISH AND WINDING CHARACTERISTICS OF A MAGNETIC HEAD SUBASSEMBLY

BACKGROUND OF THE INVENTION

1. Field of the Invention

Electronic data processing and, more particularly, the testing of magnetic recording transducers.

2. Description of the Prior Art

Magnetic recording heads, such as the multi-channel transducer described in U. S. Pat. No. 3,064,333, "-Method of Making a Magnetic Transducer," by F. T. Kristiansen et al., issued Nov. 20, 1962, and assigned to the International Business Machines Corporation, Armonk, N.Y., are manufactured by assembling individual elements, each carrying a winding, into read or write sections. Complete magnetic paths are formed by subsequently combining these sections with pole pieces having surfaces mating top gap and back gap surfaces of the associated read or write sections. It is essential that the gap boundaries be accurately formed and that undesirable surface irregularities, material imperfections, winding and connection errors, etc. be identified before additional expensive assembly operations are performed. In the prior art, such problems are detected either after full assembly, requiring scrapping of the entire head, or by complicated multi-step and, nevertheless, incomplete testing prior to full assembly.

For example, in the prior art, surface flatness of magnetic heads has been determined by tracing the profile of surface irregularities with a scanning stylus mounted on a transducer and recording the profile for subsequent manual analysis. This is an accurate but relatively slow method and does not identify winding defects and other materials problems not evident from the surface flatness. Also, in the prior art, winding characteristics have been tested by vector impedance meters which indicate whether the electrical winding characteristics are within acceptable limits. However, this approach tells little about the head's material characteristics and nothing about the gap surface flatness. It is also known that surface imperfections cause detectable changes in magnetic fields. However, gauss meters used for accurately measuring magnetic field intensity utilize relatively small sensing probes which must be scanned over a surface as large as a magnetic head gap. Performance of such prior art tests upon a plurality of head elements presents extreme difficulties, especially if performed in sequence as part of an automatic testing program, because the required switches undesirably introduce noise signal distortions.

SUMMARY OF THE INVENTION

A multi-channel section or subassembly of a magnetic transducer intended for reading and recording information as magnetized areas on tape, discs, drums, etc., is tested at an early stage of manufacture with a dummy block placed against the gap surface to simulate portions of the head, such as pole pieces, frame sections, other read or write sections, etc., supplied in later manufacturing steps. The head gap surface flatness and winding characteristics are simultaneously tested by measuring the impedance magnitude and phase angle of each head winding. The magnitude and phase angle of the impedance indicate the accuracy of the gap flatness, the electrical, magnetic and mechanical characteristics of the winding and the section material. Additional tests of the electrical characteristics are performed by providing a winding of known characteristics to aid in identifying winding errors. Continuity tests may be performed between the winding connections and the section frame enclosure to locate open and shorted windings.

The tests may be performed either simultaneously or in any desired sequence manually, under automatic program control, etc. If desired, test results may be recorded, processed and interpreted by an associated computer which may also control the conduct and order of the tests. A plurality of elements in a head section are tested either by moving each element at a time against one block, providing a plurality of blocks, a large block, etc. In one embodiment, the section is placed against one block in a fixture, and the entire fixture is rotated to connect one winding at a time to an external impedance meter. In another embodiment, the fixture is stationary and a rotating switch externally connects each winding.

The foregoing and other features and advantages of the invention will be apparent from the following more particular description of preferred embodiments of the invention, as illustrated in the accompanying drawings.

DETAILED DESCRIPTION OF THE PREFERRED EMBODIMENTS

As is described in the previously referenced Kristiansen et al patent, multi-channel (or multi-track) magnetic transducers include read sections and write sections manufactured in a number of steps involving the successive formation of separate elements (or components) for each channel, read and write sections (assemblies or subassemblies), etc. The multi-channel sections are subsequently fitted together with other frame components to form gaps which must be absolutely flat. The testing of these surfaces by the system to be described herein provides not only a test of the surface flatness but, additionally, tests for magnetic, electrical characteristics and material defects. While any head section may be tested, an illustrative prior art subassembly is section 210 of FIG. 3.

Figure 1:
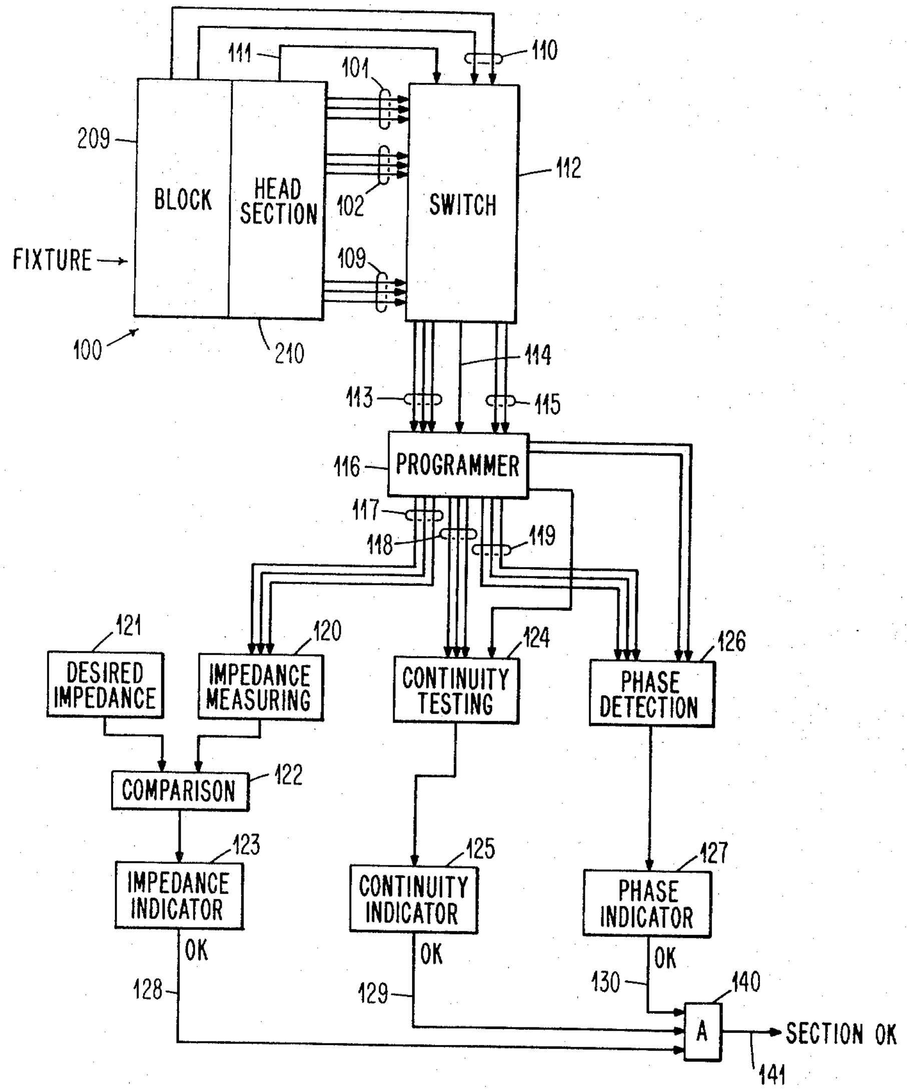
FIG. 1 is a block diagram showing an automatic testing system.

Referring to FIG. 1, head section 210 is placed in a fixture 100, and the face of the gap to be tested is abutted against a block 209, simulating head parts to be supplied later, and having block winding leads 110. The block is made of suitable magnetic material, such as permalloy, and should extend over the entire gap face being tested. Leads 110 from the block winding and leads 101 through 109 from each of, for example, nine head section coil windings are connected to switch 112, together with a connection 111 from the frame enclosure of the head section 210. The switch 112 connects one winding of the head section 210, at a time, and the frame and block lines 111 and 110 to a programmer 116 which controls the timing of tests to be performed.

The order of testing is essentially arbitrary: The order selected for illustration is impedance, phase and continuity for a first element, and then the same tests for a second element, etc. The first test may be an impedance measuring test whereby one winding, for example 101, selected by the switch 112 for connection to the programmer 116 by wires 113, is connected by the programmer 116 to an impedance measuring device 120 by wires 117. Any impedance measuring device may be used, for example, the Hewlett-Packard Model 4800A Vector Impedance Meter. The magnitude Z and phase $\theta$ of the impedance of the head section indicates the flatness of the head gap face. For example, when the impedance magnitude and phase angle of a winding are tested in free air, the value will be approximately one-half that of a head abutted perfectly flatly against a block or against frame components in a fully assembled head. Therefore, in this test, the correct reading of the impedance meter may be estimated and used to indicate the existence of winding errors or scratches or depressions on the pole tip at the gap. Typical readings for one winding of an IBM 2420 Model V head write section are $Z = 1550$ ohms, $\theta = 48°$ and, for a read section, $Z = 1900$ ohms, $\theta = 60°$. If, during subsequent tests, all tracks have abnormally low readings, a poorly ground surface or, perhaps, cold working of the materials during the grinding operations is indicated. The desired impedance is specified by block 121 which may be a register, independent source of information in a computer, etc. Comparison of the desired impedance with the actual measured impedance is performed by comparison circuit 122 which may be an electronic comparator, comparison operation performed by a computer, etc. An impedance indicator 123 may be provided to show, by a signal on line 128, that the desired impedance and the measured impedance are within an acceptable range of each other. This may be performed by visual indication or by a computer which records this information for subsequent processing together with other information.

The second test performed is phase detection which compares the known orientation of the winding about the block 209 with the orientation of each of the windings of the head section in turn. The phase detection circuit 126 may be operated to send a signal into either the block winding leads 110 or the head winding leads being tested and detect the signal from the other one. If the detected signals have a predetermined orientation, the windings are mounted correctly; if not, the windings are incorrect and, if possible, the connections must be reversed before final assembly of the head. The phase detection circuit 126 may be connected to a phase indicator 127 which may be a digital voltmeter, some other visual circuit, or an operation in a computer. A satisfactory test is indicated by a signal on line 130.

The third test performed is a continuity test which attempts to circulate a current through the frame line 111 of the head section 210 and each of the winding leads 101–109 of the head section in turn. Continuity testing block 124 may be a switch, relay, or other device which supplies the necessary current. Continuity indicator 125 may be any device for indicating that there is an undesirable current flowing between the frame of the head section and the windings. For example, this may be a digital voltmeter across a resistor or it may be the monitoring operation in a computer. A satisfactory test is indicated by a signal on line 129.

If all the tests are satisfactory, signals preset on the OK lines 128 through 130 will be detected by an AND circuit 140 which places a signal on line 141 indicating that the head section being tested is satisfactory (passed) or, if desired, a reverse signal may indicate that the section is rejected. The indications on lines 128 through 130 may be reversed and an OR circuit substituted, if desired. It will be understood by those skilled in the art that the entire operation may be programmed on a digital computer which receives signals from the switch 112 or, if desired, directly from the fixture 100.

Figure 2A:
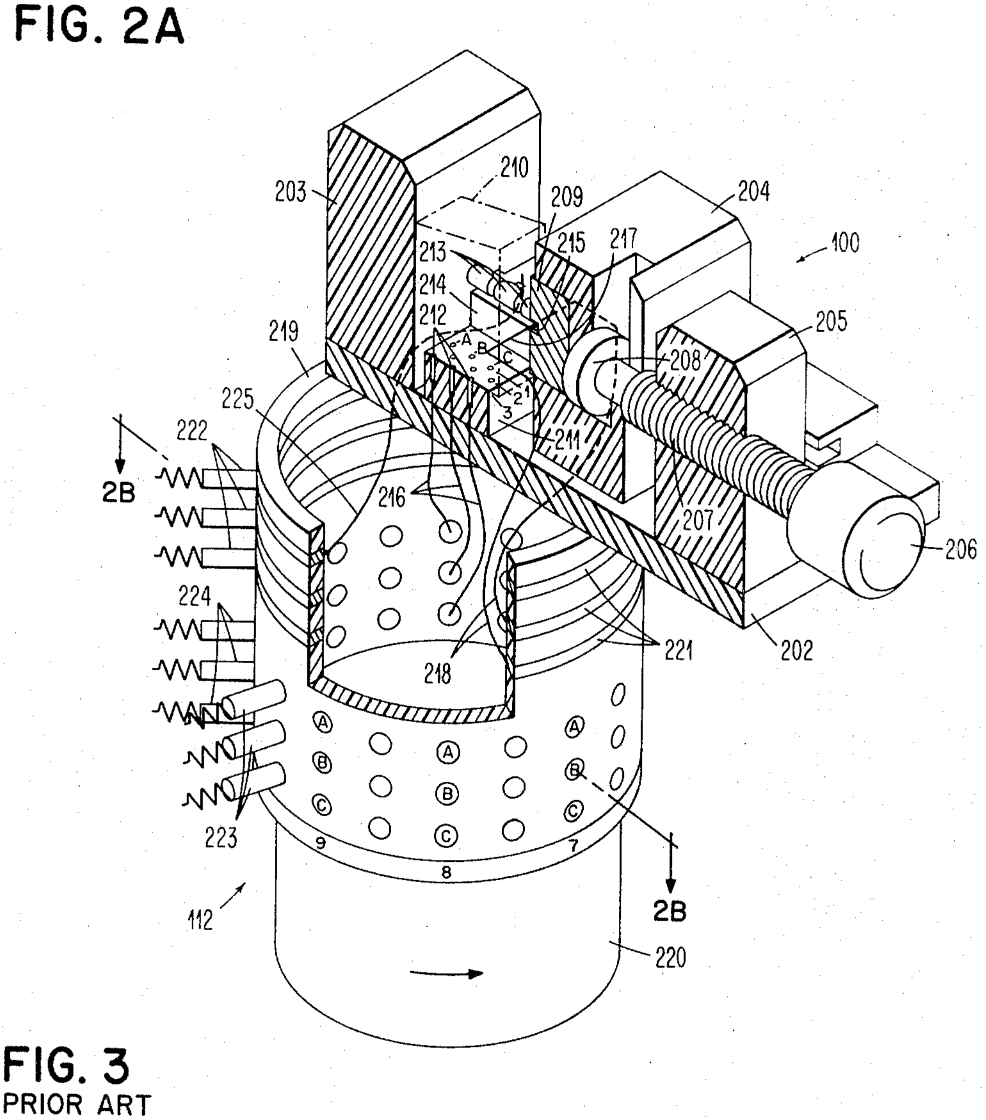
FIG. 2A is a cut-away view of the fixture and one embodiment of a switch.

The fixture 100 and one embodiment of the switch 112 will now be explained in more detail with reference to FIG. 2A. The fixture 100 is a vise-like device for fixedly retaining a magnetic head section 210 (shown as a cross-section through section line 2A—2A of FIG. 3) having a plurality of windings, one for each channel, which are tested one at a time by rotation of the drum-like switch 112. The head 210 is retained in the fixture 100 by a contact block 211 having socket holes 212 for receiving terminal pins of the head 210. For example, a nine-channel head is provided with 27 terminals: each write coil uses three terminals and each read channel uses two (a center-tap terminal is provided but not used). The windings and corresponding terminals are numbered 1–9 and each winding's terminals are designated A, B (center-tap), and C. Two sides of the head 210 are held in position by two opposing sets of frame contact spring leaves 213 (of which only one set is shown). The head 210 is fixedly held between a back jaw 203 and a front jaw 204 holding a dummy block 209 representing a part of the head to be supplied in a later assembly operation. The dummy block 209 may have a notch 215 cut around its waist to carry a winding 217. The back jaw 204 is advanced by a bearing plate 208 driven by a threaded shaft 207, retained in a holder 205 and attached to handle or socket 206. The entire fixture is mounted on base 202 attached to a shell 219 of switch 112.

Figure 2B:
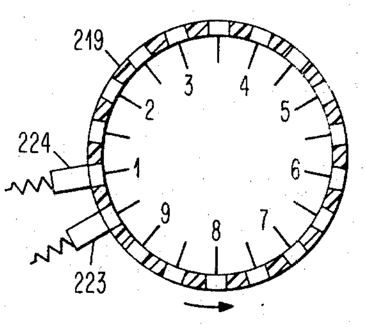
FIG. 2B is a cross-section at section line 2B—2B through the switch of FIG. 2A.

The switch 112 is rotatably mounted on a motor drive shaft, stepping solenoid, etc., connected to switch base 220. The shell 219 carries a plurality of contacts, 27 of which are connected to correspondingly labeled pins on the socket 211. 27 additional contacts are provided but not connected. Each set of terminals A, B, and C is connected to brushes 223 and 224 as the switch is rotated. Separate brush sets 223 and 224 are provided to isolate test equipment. Isolation, as will be understood by those skilled in the art, may be obtained with one set of brushes on half the number of terminals if appropriate switches are provided. Brushes 224 are first contacted by a set of terminals and, thereafter, the same contacts will contact brushes 223, while brushes 224 contact a set of unconnected terminals. The brushes may be made of carbon, copper, gold-plated copper, etc. There are also provided three slip rings 221 continually contacting brushes 222. The lower two slip rings 221 are directly connected, by soldering, welding, etc., to the winding 217 leads 218. The upper one of the slip rings 221 is connected to the frame of the head 210 by means of the leaf spring lead 225. Rotation of the switch 112 brings each of the windings of the head into contact with the brushes 223 and 224 in turn. Referring to FIG. 2B, the order of switch rotation is illustrated. For example, the first winding is connected to brushes 224 and then, by subsequent rotation of the drum 219, it is connected to the brushes 223.

Figure 3:
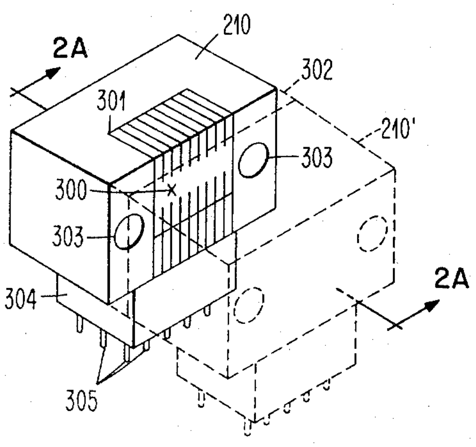
FIG. 3 PRIOR ART
FIG. 3 is a perspective view of a prior art magnetic transducer.

Referring now to FIG. 3, a prior art magnetic head is shown to illustrate the stage of assembly at which the testing is performed. The head 210 includes a number of winding carrying elements 301 forming a flat face 300. A frame component or pole piece 302 is subsequently placed flush with this surface to form the completed head read or write section. One read section (for example 210) and one write section (for example 210') together form a complete head. The head subassembly has a terminal base 304 with pins 305 for insertion in socket holes 212. The entire head is assembled by fasteners through holes 303. During the testing operation described herein, section 210 is placed into the fixture 100 by plugging base 304 into socket 211. Rotation of the entire fixture 100 provides external contact for each of the windings in each of elements 301 in turn. However, it is not necessary that the entire switch 112 move.

Figure 4:
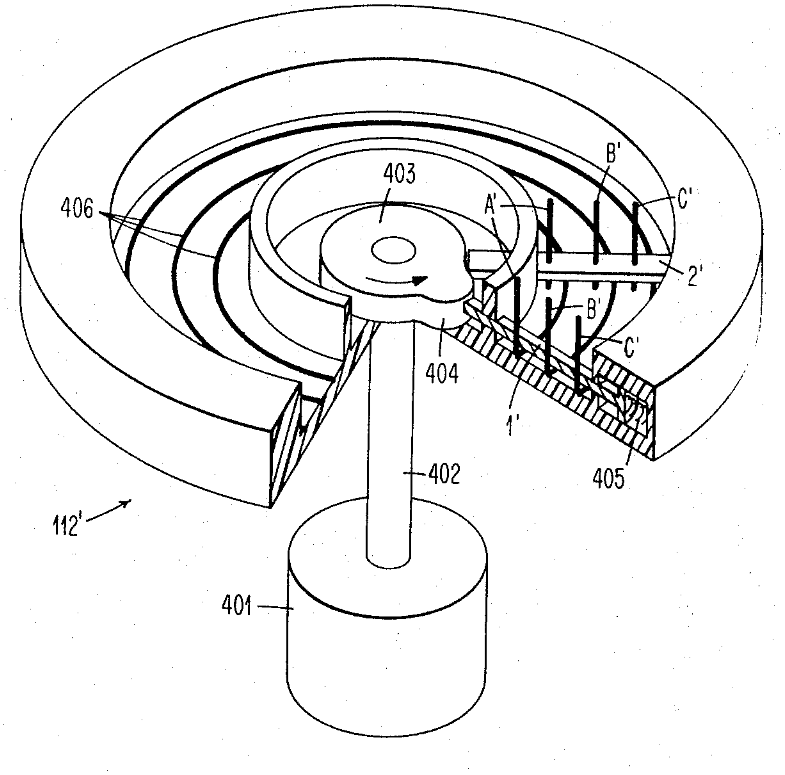
FIG. 4 is a cut-away view of an alternative embodiment of the switch.

Referring now to FIG. 4, an alternative embodiment utilizing a stationary switch is shown. Switch 112' is stationary and a motor 401 drives a shaft 402 to turn a cam 403 carrying cam riser 404 which moves a number of switch arms 1', 2', etc. to connect winding leads A, B, and C, for windings 1, 2, etc. to brush rings 406. Springs 405 return the arms to their normal positions (contacts open) when the cam riser 404 moves to the next arm. Such a switch provides the necessary low capacitance contacts without requiring movement of the entire fixture. It will be understood that rings 406 provide the function of brushes 223 in FIG. 2A, and that the functions of brushes 222 and 224 can, if desired, be similarly provided.

The operation of the invention will now be described with reference to the circuit diagram of FIG. 5A and the relay timing table of FIG. 5B. The switch 112 includes brushes 223 and 224 with adjacent contacts A, B, and C, and brushes 222 with adjacent slip rings 221. Slip rings 221 are connected to the block winding leads 218 and the frame wire 225. The brushes 224 and 223 are each connected to the winding 1, 2, 3, etc. of the magnetic head as the switch 112 rotates. As previously described, while there are three wires A, B, C to the windings shown, the center wire B represents a center tap provided only in write sections and not in sections intended for reading. The impedance measuring test is performed by closing normally-open contacts K0 connecting the brushes 224 to the impedance measuring device 120. The impedance measuring device 120 is provided with its own set of brushes 224 to prevent any undesirable coupling to other testing devices and circuits. A phase test is performed by closing normally-open contacts K2 and K3 to generate a pulse in the block winding leads 218 which is detected in the winding being tested by brushes 224. The pulse, generated by discharging capacitor 505 into the winding leads 218, appears across resistor 504, monitored by amplifier 501, and induces a current, of known magnitude and direction, for a correct winding direction, through either the resistor 502 or diode 503. If the winding direction is wrong, the diode 503 conducts and a voltage will not appear across resistor 502. If the winding direction is correct, the diode does not conduct, and the amplifier 500 senses the potential across the resistor 502, and a phase indicator 127 compares the potential magnitude and direction detected by the amplifiers 500 and 501. If the potentials are adjusted to be equal for normal operation, the phase indicator 127 will have no output if the windings are correct. The center lead is connected to one side, or the other, of the diode 503 during read operations, as will be explained below. A second set of brushes 223 is subsequently connected to the same winding previously connected to brushes 224, by stepping the switch one position. Operation of normally-open contacts K1 connects all leads of that winding to a continuity indicator 125 which senses, as a voltage, current through resistor 506. Closure of contacts K1 attempts to pass a current through the resistor 506 and all the windings connected together via the frame wire 225. A voltage is detected only if there is an undesirable short between the windings and the frame. If desired, each of the winding leads could be tested independently for a path to the frame. The outputs of the impedance measuring circuit 120, continuity indicator 125, and phase indicator 127 may be cabled to a data processing system for further monitoring and utilization, if so desired.

Figure 5B:
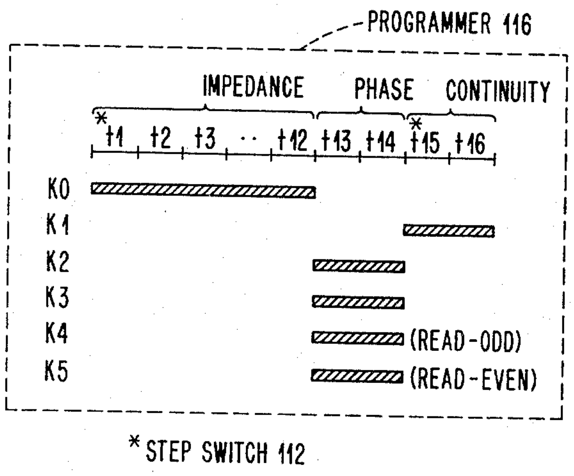
FIG. 5B is a timing table of the programmer showing the operation of contacts in FIG. 5A.
Figure 5A:
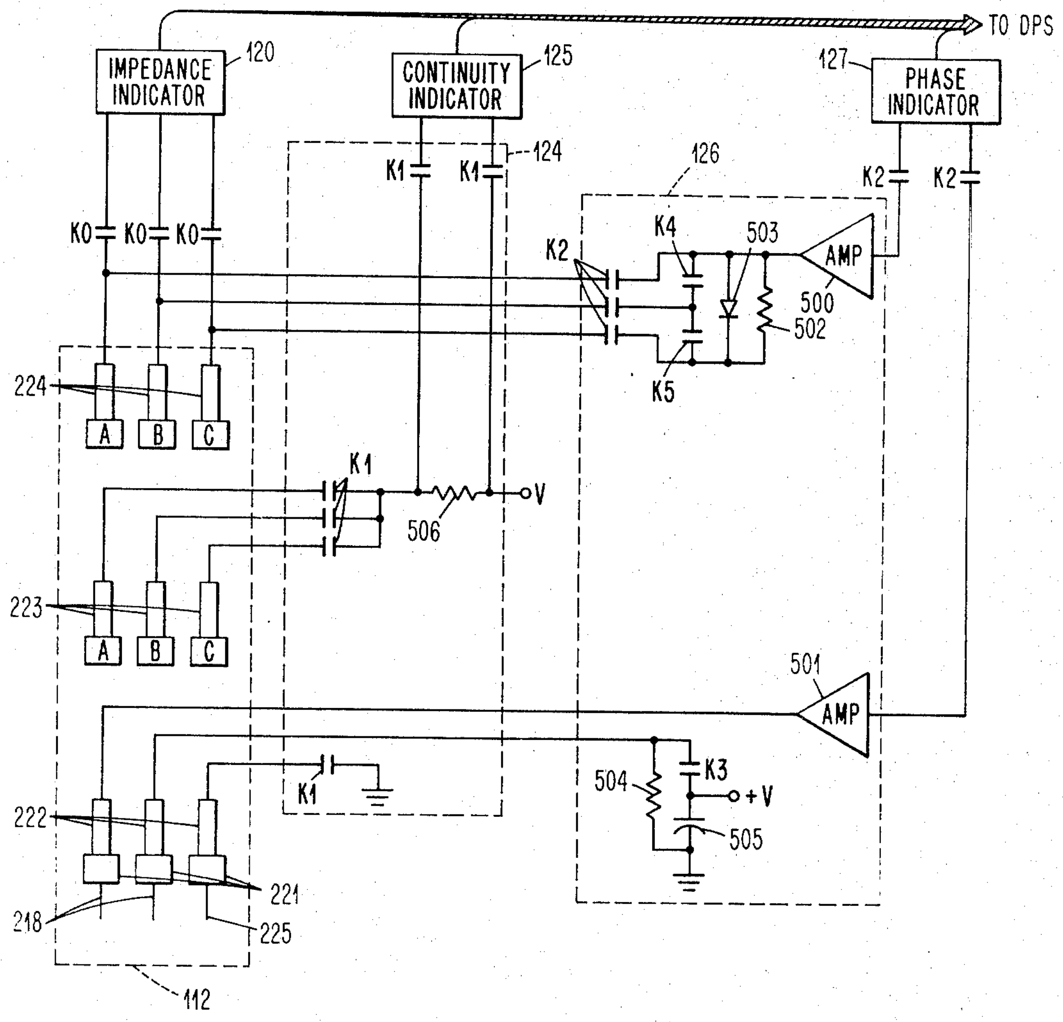
FIG. 5A is a logic diagram of the automatic testing system.

Referring now to FIG. 5B, the programmer 116 sequencing and switch 112 stepping will be described. The contacts K0 through K5 shown in FIG. 5A are operated by relay coils, or other devices, at times $t1$ through $t16$, and the switch is stepped at times $t1$ and $t15$. The impedance measuring period occurs during times $t1$ through $t12$, when contacts K0 are closed. At times $t13$ and $t14$, contacts K2 and K3 are closed for the phase test. In the case of read sections, contact K4 is closed for all odd numbered windings 1, 3, 5, etc., and contact K5 is closed for even-numbered windings 2, 4, 6, etc. After the phase test, at time $t15$, the switch 112 is stepped to bring the winding under test to brushes 223 and contacts K1 are closed for the period from $t15$ to $t16$ to conduct a continuity test. This is repeated for each winding and, subsequently, a new head is inserted in the fixture and the testing is repeated.

The invention is equally applicable to testing of other sections of magnetic heads. For example, the surface flatness of center sections (between read and write sections) can be tested by mounting a read or write section in the fixture as a testing dummy and replacing the dummy block with another dummy appropriately representing the balance of the head. Center sections to be tested are then inserted in the fixture between the testing dummy and the new dummy block for testing in the manner previously described.

While the invention has been particularly shown and described with reference to preferred embodiments thereof, it will be understood by those skilled in the art that various changes in form and details may be made therein without departing from the spirit and scope of the invention.

What is claimed is:

1. Apparatus for simultaneously testing the gap surface finish and winding characteristics of a magnetic head subassembly, comprising:

a fixture for firmly holding the head subassembly having a plurality of head windings in a predetermined position;

a block, associated with said fixture, firmly held in a predetermined position, mating with the gap surface of the head subassembly, and closing the head magnetic circuit;

impedance measuring means, connected to a head winding, for indicating the magnitude and phase of the winding impedance;

comparison means, connected to the impedance measuring means, for comparing the impedance measured with a predetermined acceptable impedance;

indicating means, connected to the comparison means for indicating when the measured impedance and the acceptable impedance bear a predetermined relationship to identify acceptable and non-acceptable head subassemblies; and switching means for connecting each of the windings in turn to the impedance measuring means.

2. The apparatus of claim 1 wherein the switching means includes contacts and brushes and provides a pedestal for the fixture, rotation of the switching means together with the fixture relative to the brushes presenting the contacts, corresponding to one winding at a time, to the brushes through which the impedance measuring means are connected to the windings.

3. The apparatus of claim 1 wherein the switching means has a set of contacts for each winding, a plurality of concentric rings and a rotatable central cam, each contact set being made available in turn to a number of the rings by rotation of the cam.

4. The apparatus of claim 1 wherein the block includes a notch for carrying a fixed winding, and there are provided phase detection means connected to the switching means and the fixed winding operable to indicate a predetermined relationship between the fixed winding and the head winding under test.

5. The apparatus of claim 1 wherein there are provided a frame contact to the head subassembly and a continuity testing means connected to the switching means and the frame contact for measuring the existence of undesirable circuits between the head winding under test and the frame.

6. The method of testing a magnetic transducer subassembly, containing a plurality of windings, for electrical, magnetic and material defects, comprising the steps of:

fastening the subassembly in a fixed relationship to a dummy component representing another portion of the transducer;

connecting a first winding contained in said subassembly to a common set of wires;

measuring, at the common set of wires, the magnitude and phase of the impedance of the first winding;

comparing the measured impedance with a predetermined impedance;

connecting additional windings contained in said sub-assembly, one at a time, to the common set of wires and measuring and comparing the magnitude and phase of the impedance of each of the windings in turn; and passing transducers having windings which are all within a fixed range of the predetermined impedance and rejecting transducers having any one winding which is not within said fixed range.

7. The method of claim 6 wherein the dummy component carries a winding and the polarity of each transducer subassembly winding is determined by comparing it to the polarity of the dummy subassembly winding.

8. In combination:

a first subassembly of a magnetic transducer comprising a plurality of windings retained in a housing having a flat face intended to intimately mate with a flat face on a second sub-assembly of the transducer;

a substantially metallic block, representing the second subassembly, having a face of known flatness matable with the flat face of the first subassembly and a winding upon the block having a known winding direction;

a fixture for fixing in position the first subassembly and metallic block with the flat faces intimately mated and providing, for external utilization, electrical connections to the transducer windings;

impedance measuring means connected to the fixture electrical connections to establish the flatness of the first subassembly face; and winding direction determining means connected to the fixture electrical connections and the block winding for comparing the transducer winding directions with the known block winding direction to establish each transducer winding's direction.

9. The combination of claim 8 wherein the winding direction determining means includes:

a pulse source connected to a selected one of the fixture electrical connections and the block winding, for supplying a pulse of known polarity;

a pulse detector, connected to one of the fixture electrical connections and the block winding, other than the one selected for connection to said source, for detecting the polarity of a signal induced by aforesaid pulse; and comparison means, associated with the pulse source and detector for determining the relative polarities of the generated pulses and induced signal thereby deducing transducer winding direction.

10. Apparatus for testing the gap surface finish of a magnetic head subassembly, having a number of head windings, comprising:

a fixture for firmly holding a head subassembly to be tested in a predetermined position;

a dummy head subassembly, firmly held in a predetermined position in said fixture, mating with the gap surface of the head subassembly;

impedance measuring means, connected to a selected one a said number of head windings, for indicating the magnitude and phase of the winding impedance;

comparison means, connected to the impedance measuring means, for comparing the impedance measured with a predetermined acceptable impedance;

indicating means, connected to the comparison means for indicating when the measured impedance and the acceptable impedance bear a predetermined relationship to identify acceptable and non-acceptable tested head subassemblies; and switching means for connecting each of the windings in turn to the impedance measuring means.

11. The apparatus of claim 10 wherein the switching means provides contacts and brushes and a pedestal for the fixture, whereby rotation of the switching means together with the fixture presents the contacts, corresponding to one winding at a time, to the brushes to connect the impedance measuring means to the windings.

12. The apparatus of claim 10 wherein the switching means further includes concentric rings and a central cam, there being a set of contacts for each winding, each set of contacts being made available in turn to a set of concentric rings by rotation of the cam.

13. The method of testing a subassembly of a magnetic transducer having a plurality of windings, comprising the steps of:

fastening the subassembly in a fixed relationship to a dummy component representing another portion of the transducer;

connecting a first of said plurality of windings to a common set of wires;

measuring, at the common set of wires, the magnitude and phase of the impedance of the first winding;

comparing the measured impedance with a predetermined impedance;

connecting others of said plurality of windings, one at a time, to the common set of wires and measuring and comparing the magnitude and phase of the impedance of each of the windings in turn; and passing transducers giving measurements which are all within a fixed range of the predetermined impedance and rejecting transducers having any one measurement which is not within said fixed range.

* * * * *